May 24, 1955     F. C. POLANSKI     2,709,094

CLAMPING BAND MANUFACTURE

Filed Oct. 20, 1952

INVENTOR.
Frank C. Polanski
BY
ATTORNEYS

United States Patent Office 2,709,094
Patented May 24, 1955

2,709,094

CLAMPING BAND MANUFACTURE

Frank C. Polanski, Kenosha, Wis., assignor, by mesne assignments, to Ladish Co., Cudahy, Wis., a corporation of Wisconsin Application October 20, 1952, Serial No. 315,733

4 Claims. (Cl. 285—129)

This invention relates to improvements in clamping band manufacture.

Clamping bands of the general type shown in the Joseph S. Kessler application for patent, Serial No. 206,947, filed January 20, 1951, now Patent No. 2,649,632, dated August 25, 1953, have been found increasingly useful in sanitary piping systems. This type of band is used in connection with flanged coupling members, and has replaced union nut connections in many instances, particularly in food handling equipment.

While the clamping band shown in the Kessler application above referred to has worked out very satisfactorily in use, the manufacture of said band requires brazing of hook members or ears thereon. This is a relatively expensive and time consuming operation which must be preceded by the relatively expensive manufacture of hook members.

With the above in mind, it is a general object of the present invention to provide an improved clamping band having its end portions reversely bent in a novel manner to form integral hooked elements or ears.

A further object of the invention is to provide an inexpensive method of manufacturing the improved clamping band.

A further object of the invention is to provide an improved clamping band and method of manufacturing the same, which band is stronger than similar bands of brazed construction, is easily cleaned, and is otherwise well adapted for use in sanitary piping systems and food handling equipment.

A more specific object of the invention is to provide an improved method of manufacturing a clamping band of the class described including a novel machining step which makes possible the improved unitary construction.

With the above and other objects in view, the invention consists of the improved clamping band, and method of manufacturing the same, and all of the steps, parts and combinations incident thereto, as set forth in the claims, and all equivalents thereof.

In the drawing accompanying and forming a part of this specification, wherein one complete embodiment of the preferred form of the invention is shown, and various stages in the improved method are illustrated, and wherein like characters of reference indicate the same parts in all of the views.

Figure 5:
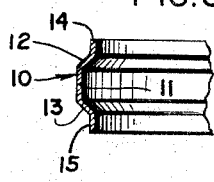
Fig. 5 is an enlarged sectional plan view taken along the line 5—5 of Fig. 1, showing the cross-sectional conformation of the improved band.

Referring more particularly to the drawing, the improved band is manufactured of stock which is generally channel-shaped in transverse cross-section, the preferred cross-sectional form being shown in Fig. 5. As shown in Fig. 5, the stock has a flat central wall portion 11, a pair of divergent wall portions or flanges 12 and 13, and a pair of laterally directed edge flanges 14 and 15 connected to the wall portions 12 and 13 respectively, said flanges being substantially parallel with the central wall portion 11.

Figure 1:
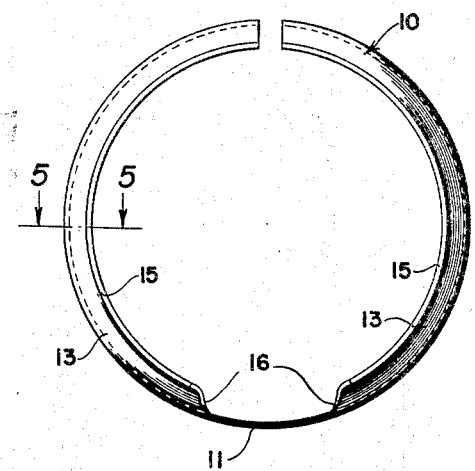
Fig. 1 is a side elevational view of a circular extent of channel-shaped band stock during one stage of the manufacture of the improved band.

The stock from which the improved band is made is first formed into a helical coil, after which each convolution of the coil is cut therefrom to form individual rings or bands 10 of circular conformation as shown in Fig. 1. Then, by a suitable notching operation, the wall portions 12 and 13 and flanges 14 and 15 are cut away diametrically opposite the ends of said band, as at 16. The remaining wall portion 11 of the cut 16 is free to flex and serve somewhat as a hinge for the sections of the extent 10 on each side thereof.

Figure 2:
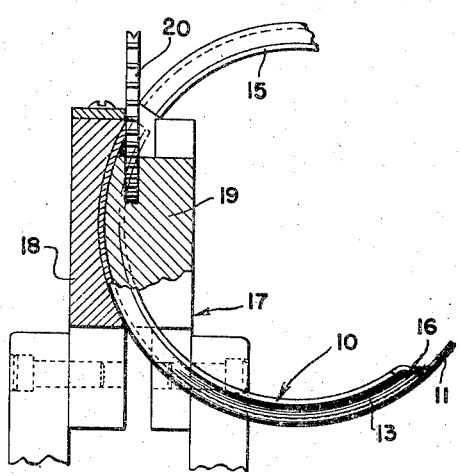
Fig. 2 is a side elevational view, partly in section, showing an end portion of the band of Fig. 1 being cut away during a milling operation.

The formed and notched circular band 10 is then placed in a suitable holding means, such as the vise 17 (see Fig. 2) having jaws 18 and 19 conforming to the contour of said band. While the band 10 is held by the vise 17, one end portion is cut away on an acute angle with respect to the periphery of said band, as by a milling cutter 20, to form the sidewalls 12 and 13 with tapered end portions 21 (see Fig. 3). At the same time, the end portions of edge flanges 14 and 15 are cut away as shown. The band 10 is then reversed in the vise 17, and the other end of said band is cut away on an acute angle with respect to the periphery of said band to form sidewalls 12 and 13 with tapered end portions 22, shown in Fig. 3, and simultaneously remove the end portions of edge flanges 14 and 15, as shown.

Figure 3:
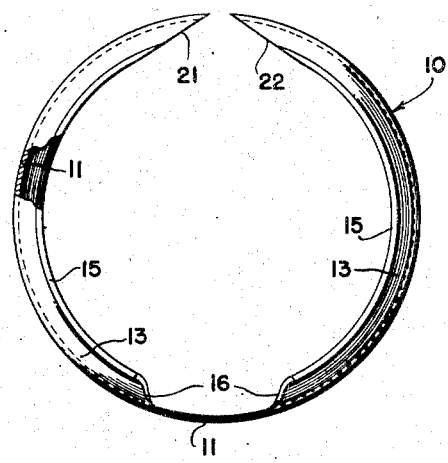
Fig. 3 is a side elevational view of the band of Fig. 1 with both end portions cut away by the milling operation of Fig. 2.
Figure 4:
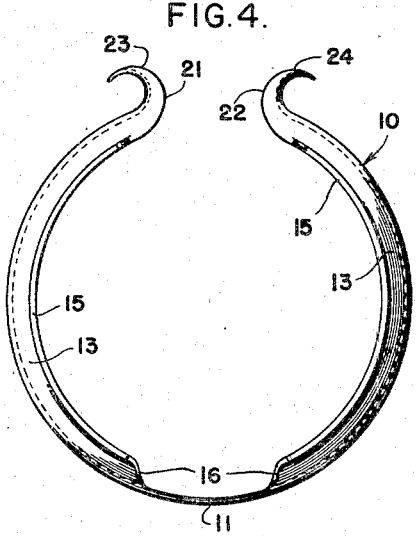
Fig. 4 is a side elevational view of the band of Fig. 3 having its milled end portions reversely bent and forming oppositely directed ears.
Figure 6:
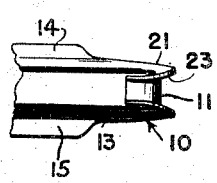
Fig. 6 is a fragmentary plan view looking at one of the ears.

The end portions of the band 10 shown in Fig. 3 are then reversely bent outwardly as shown in Fig. 4 by suitable bending equipment to form the finished band having oppositely directed ears 23 and 24. The ears 23 and 24 are strong by reason of the reinforcing action of the remaining wall portions 12 and 13 which are tapered to the end and provide a tapered channel-shape for the ears as shown in Figs. 4 and 6. Cutting away portions of flanges 14 and 15 to create the angled side wall portions 21 and 22 makes it possible to bend the ears 23 and 24 on the relatively small radius shown in Fig. 4.

The improved band is easily cleaned, and its integral construction eliminates any possibility of inoperativeness since there are no brazed joints to come apart. The improved method is inexpensive to carry out, and the improved band is lighter in weight than conventional bands, thus further reducing the cost of the improved band.

Various changes and modifications may be made without departing from the spirit of the invention, and all of such changes are contemplated, as may come within the scope of the claims.

What I claim is:

1. The method of forming a hook-shaped ear on a clamping band of the type which is formed from stock which is channel-shaped in transverse cross section and which has inwardly directed side walls, including the steps of cutting away said side walls at the end portion of said band on an acute angle with respect to the outer surface of said band to cause said side walls to taper toward said end, and then arcuately bending said end portion outwardly to form an integral ear having tapered reinforcing side walls.

2. The method of forming a hook-shaped ear on a clamping band of the type which is formed from stock which is channel-shaped in transverse cross section and which has inwardly directed side walls formed with laterally outwardly directed edge flanges, including the steps of cutting away said side walls at the end portion of said band on an acute angle with respect to the outer side of said band to cause said side walls to taper toward the end of said band, thereby completely removing said edge flanges at said tapered portion; and then arcuately bending said end portion outwardly to form an integral hook-shaped ear having tapered reinforcing side walls which are devoid of edge flanges.

3. A clamping band comprising a circular extent of stock which is generally channel-shaped in transverse section and which has inwardly directed side walls and juxtaposed ends, said side walls at at least one of said ends of the band tapering toward the periphery at said end, and said end portion of the band being arcuately bent in an outward direction and forming an integral ear which is channel-shaped in cross-section with said channel shape of progressively decreasing depth toward the end of the band.

4. A clamping band comprising a circular extent of stock which is generally channel-shaped in transverse cross-section, said stock having a cylindrical peripheral wall and having a pair of spaced inwardly directed side walls and having juxtaposed ends, there being a cylindrical edge flange which projects laterally outwardly from each side wall, said side walls tapering toward said peripheral wall at at least one of said ends, said edge flanges terminating at points spaced from said end and short of said tapering side wall portions, said tapering side wall portions and intervening peripheral wall being arcuately bent outwardly and forming an integral arcuate ear which is channel-shaped in cross section with said channel shape of progressively decreasing depth toward said end of the band.

References Cited in the file of this patent

UNITED STATES PATENTS

| | | |
|---|---|---|
| 121,929 | Burger | Dec. 19, 1871 |
| 210,560 | Robertshaw | Dec. 3, 1878 |
| 421,004 | Kimball | Feb. 11, 1890 |
| 978,222 | Schlafly | Dec. 13, 1910 |
| 984,086 | Graham | Feb. 14, 1911 |
| 992,301 | Walsh | May 16, 1911 |
| 1,496,507 | Wolfe et al. | June 3, 1924 |
| 2,285,850 | Weeks | June 9, 1942 |

FOREIGN PATENTS

| | | |
|---|---|---|
| 731,319 | France | May 30, 1932 |